United States Patent Office 3,850,909
Patented Nov. 26, 1974

3,850,909
AROMATIC SUBSTITUTED AMIDINES
Franklyn W. Gubitz, Nassau, N.Y., assignor to Sterling Drug Inc., New York, N.Y.
No Drawing. Continuation-in-part of application Ser. No. 796,187, Feb. 3, 1969, now Patent No. 3,697,505. This application Oct. 26, 1971, Ser. No. 192,559
Int. Cl. C07d 41/04, 41/08
U.S. Cl. 260—239 B
44 Claims

ABSTRACT OF THE DISCLOSURE

Substituted amidines of the formula $$Ar(CH_2)_nC(N=Z)=NR$$

where Ar is unsubstituted pyridyl or substituted phenyl, $n$ is 0 or an integer from 1 to 3, N=Z is 7–9 ring membered polymethylenimino and R is lower-alkyl, lower-alkenyl or substituted lower-alkyl, having diuretic and anti-inflammatory activity, are prepared by interacting an amide of the formula $Ar(CH_2)_nCONHR$ with phosphorus pentachloride, and interacting the resulting imidyl chloride, $Ar(CH_2)_nC(Cl)=NR$ with a secondary-amine, HN=Z.

---

This application is a continuation-in-part of my prior copending application, Ser. No. 796,187, filed Feb. 3, 1969, now U.S. Pat. 3,697,505.

This invention relates to aromatic substituted amidines, and more particularly is concerned with amidines completely substituted on the nitrogen atoms, and substituted on the carbon atom by monocarbocyclic aryl or pyridyl groups, and with methods for their preparation.

The compounds of the invention are represented by the following structural formula

wherein Ar is unsubstituted pyridyl or phenyl substituted by from one to three substituents selected from the group consisting of halogen, trifluoromethyl, trifluoromethoxy, nitro, lower-alkoxy, lower-alkylthio, lower-alkylsulfoxy, lower-alkylsulfonyl, amino, lower-alkanoylamino, bis (methylsulfonyl)amino, sulfamyl, lower-alkylsulfamyl and di-lower-alkylsulfamyl; $n$ is 0 or an integer from 1 to 3; N=Z is a polymethylenimino having from 7 to 9 ring members; and R is lower-alkyl, lower-alkenyl, cycloalkyl of 3–6 ring members, cycloalkyl-lower-alkyl wherein cycloalkyl has 3–6 ring members, phenyl-lower-alkyl, hydroxy-lower-alkyl or lower-alkanoyloxy-lower-alkyl.

In the foregoing definitions the terms lower-alkyl, lower-alkoxy, lower-alkenyl and lower-alkanoyloxy refer to such groups having up to six carbon atoms and which can have straight or branched chains.

In the above formula I, N=Z stands for polymethylenimino having from 7 to 9 ring members and a total of from six to about twelve carbon atoms, for example, hexamethylenimino, heptamethylenimino, octamethylenimino and lower-alkylated derivatives thereof.

The compounds of formula I are prepared by the following reaction scheme:

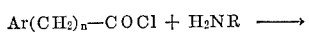

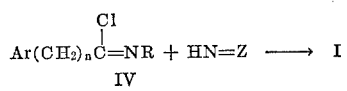

An acid chloride of formula II is treated with a primary-amine, H₂NR, to produce the amide of formula III. The amide III is then treated in an inert solvent with phosphorus pentachloride to produce the imidyl chloride of formula IV. The reaction takes place at a temperature between about 50° and 150° C., conveniently at the reflux temperature of the inert solvent. The phosphorus pentachloride can be replaced by thionyl chloride if desired. The final step comprises treating the imidyl chloride IV with a secondary-amine, HN=Z, in an inert solvent. The reaction takes place at a temperature between about 20° and 150° C.

The compounds of formula I wherein $n$ is 1–3 can be prepared by an alternative route as follows:

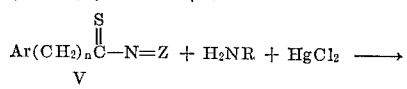

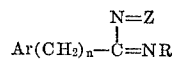

(I; $n=1-3$)

An aryl lower-alkyl ketone heated with a secondary amine, HN=Z, and sulfur gives a thioamide of formula V. The latter is then interacted with a primary-amine, H₂NR, in the presence of mercuric chloride to give a compound of formula I wherein $n$ is 1–3.

The compounds of the invention are basic in nature and readily form acid-addition or quaternary ammonium salts. Said acid-addition and quaternary ammonium salts are within the purview of the invention and are the full equivalents of the free bases claimed herein.

It is thus be appreciated that formula I not only represents the structural configuration of the bases of formula I but is also representative of the respective structural entity which is common to all of the respective compounds of formula I whether in the form of the free bases or in the form of the acid-addition or quaternary ammonium salts of the bases. By virtue of this common structural entity, the bases and their salts have inherent biological activity of a type to be more fully described hereinbelow. When used for pharmaceutical purposes one can employ the free bases themselves or the acid-addition or quaternary ammonium salts formed from pharmaceutically-acceptable acids or esters, that is, acids or esters whose anions are innocuous to the animal organism in effective doses of the salts so that beneficial properties inherent in the common structural entity represented by the free bases are not vitiated by side-effects ascribable to the anions.

In utilizing the pharmacodynamic activity of the salts of the invention, pharmaceutically-acceptable salts are preferred. Although water-insolubility, high toxicity, or lack of crystalline character may make some particular salt species unsuitable or less desirable for use as such in a given pharmaceutical application, the water-insoluble or toxic salts can be converted to any desired pharmaceutically-acceptable salt by double decomposition reactions involving the anion, for example, by ion-exchanged procedures. Moreover, apart from their usefulness in pharmaceutical applications, the salts are useful as characterizing or identifying derivatives of the free bases or in isolation or purification procedures.

It will be appreciated from the foregoing that all of the acid-addition and quaternary ammonium salts of the new bases of the invention are useful and valuable compounds, regardless of considerations of solubility, toxicity, physical form, and the like, and are accordingly within the purview of the instant invention.

The novel feature of the compounds of the invention, then, resides in the concept of the bases and cationic forms of the basic compounds of formula I and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids. Illustrative acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, cyclohexanesulfamic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the basic compounds of formula I are obtained by the addition of esters of strong acids to the free base form of the compounds, said esters having a molecular weight less than about 300. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological evaluation of the compounds of formula I has shown that they possess diuretic, natriuretic, and anti-inflammatory activity upon oral administration. These activities were demonstrated in dogs and rats by standard test procedures.

The diuretic and natriuretic activities in dogs were determined by the method of McKeon, Ach. Int. Pharmacodyn. *151*, 225–42 (1964), whereby the effect of oral administration of the test compounds upon the volume and the sodium, potassium and chloride ion content of the urine was determined.

The diuretic and natriuretic activity in rats was determined according to the procedure of Williamson et al., J. Pharm. & Exptl. Therap. *126*, 82 (1959). The compound to be tested was administered orally. A control group of animals was treated with 8 micromoles/kg. of the standard drug, hydrochlorothiazide. The dose of the test compound which produced a response half that of the reference drug, hydrochlorothiazide, was then reported as the approximate minimal effective dose.

The anti-inflammatory activity was measured by the inhibition of carrageenin-induced local foot edema in rats according to the method of Winter et al., Proc. Soc. Exptl. Biol. & Med. *111*, 544 (1962), and by the inhibition of pleurisy in rats acording to the method of Wilhelmi [Non-Steroidal Anti-Inflammatory Drugs, Proceedings of an International Symposium, Milan, 1964, Excerpta Medica Foundation, Amsterdam].

In the carrageenin-induced edema inhibition tests, one hour following medication, 0.05 ml. of 1% aqueous suspension of carrageenin was injected into the plantar tissue of their right hind foot and 0.05 ml. of saline similarly into the left foot. Three hours after injection, the rats were sacrificed and the hind feet cut off at the tibio-calcaeno-talar joint for subsequent weighing. The observed differences between the average edema weight of the control and medicated rats were expressed as percent inhibition of edema.

In the pleurisy inhibition tests, the degree of inhibition of pleural exudate formation induced by silver nitrate as an irritant in the medicated rats as compared with control rats was a measure of the anti-inflammatory activity.

The actual determination of the numerical biological data definitive for a particular compound is readily obtained by standard test procedures by technicians trained in pharmacological test procedures, without the need for any extensive experimentation. The compounds are effective in amounts of 5–50 micromoles per kilogram depending upon the compound used and the manner of administration. They are prepared for use by conventional pharmaceutical formulation procedures, that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution, or oil-water emulsion) for parenteral administration.

The structures of the compounds of the invention were established by the modes of synthesis, by elementary analysis, and by infrared, ultraviolet and nuclear magnetic resonance spectral determinations.

The following examples will further illustrate the invention without the latter being limited thereby.

A. BENZAMIDE DERIVATIVES AND ANALOGS

Example A1

*N-Allyl - 4 - chlorobenzamide* [III; Ar is 4-ClC$_6$H$_4$, *n* is 0, R is CH=CH$_2$].

A solution of 28.5 g. of allylamine in 250 ml. of chloroform was cooled in an ice bath. *p*-Chlorobenzoyl chloride (44 g.) was added dropwise with stirring. The reaction mixture was allowed to warm to room temperature and then stirred for three hours. The chloroform solution was washed with water and dilute hydrochloric acid, and dried over anhydrous calcium sulfate. The chloroform solution was concentrated *in vacuo* to remove the solvent, and the residue was crystallized from a cyclohexane - n - pentane mixture to give 37.94 g. of N-allyl - 4 - chlorobenzamide, m.p. 70–72° C.

Example A2

*N-Cyclopropylmethyl - 4 - chlorobenzamide* [III, Ar is 4-ClC$_6$H$_4$, *n* is 0, R is CH$_2$CH(CH$_2$)$_2$].

A mixture of 14.86 g. of cyclopropylmethylamine, 16.6 g. of pyridine and 200 ml. of chloroform was cooled to −15° C. *p*-Chlorobenzoyl chloride (36.7 g.) was added dropwise, and the reaction mixture was allowed to warm to room temperature and stirred for three hours. The solution was washed successively with water, dilute hydrochloric acid, dilute sodium bicarbonate and water, dried over anhydrous calcium sulfate and concentrated *in vacuo*. The residue was crystallized from cyclohexane to give 32.5 g. of N-cyclopropylmethyl-4-chlorobenzamide, colorless blade clusters, m.p. 116–118° C.

Example A3

*N-Ethyl-4-chlorobenzamide* [III; Ar is 4-ClC$_6$H$_4$, *n* is 0, R is CH$_2$CH$_3$].

A solution of 17.7 g. of ethylamine in water was cooled to −5° C., and 17.5 g. of *p*-chlorobenzoyl chloride was added dropwise with stirring. The precipitate which formed was collected and dried to give N-ethyl-4-chlorobenzamide which was used directly to form the compound of Example B3 below.

Example A4

*N - (2 - Hydroxyethyl) - 4 - chlorobenzamide* [III; Ar is 4-ClC$_6$H$_4$, *n* is 0, R is CH$_2$CH$_2$OH].

A mixture of 42.7 g. of methyl *p*-chlorobenzoate and 61.1 g. of ethanolamine was heated at reflux for three hours. The reaction mixture was poured into water, and the solid product collected by filtration and recrystallized from aqueous ethanol to give 30.5 g. of N-(2-hydroxyethyl)-4-chlorobenzamide, m.p. 108–113° C.

The following compounds were prepared by the methods of Examples A1, A2 or A3, using the appropriate acid chloride, Ar(CH$_2$)$_n$COCl, and amine, H$_2$NR:

*Example A5: N-(n-Propyl)-4-chlorobenzamide* [III; Ar is 4-ClC$_6$H$_4$, *n* is 0, R is CH$_2$CH$_2$CH$_3$] (method A1), m.p. 96–98° C. (prisms from ether-pentane).

*Example A6: N-Allyl - 4 - fluorobenzamide* [III; Ar is 4-FC$_6$H$_4$, *n* is 0, R is CH$_2$CH=CH$_2$] (method A1), m.p. 67–69° C.

*Example A7: N-Allyl-4-trifluoromethylbenzamide* [III; Ar is 4-F$_3$CC$_6$H$_4$, *n* is 0, R is CH$_2$CH=CH$_2$] (method A1), pale yellow dendrite needles.

*Example A8: N-Benzyl-4-chlorobenzamide* [III; Ar is 4-ClC$_6$H$_4$, *n* is 0, R is CH$_2$C$_6$H$_5$] (method A1), m.p. 164–166° C. (fluffy needles).

*Example A9: N-Cyclohexylmethyl - 4 - chlorobenzamide* [III; Ar is 4-ClC$_6$H$_4$, *n* is 0, R is CH$_2$CH(CH$_2$)$_5$] (method A2), m.p. 117–119° C. (needles from cyclohexane).

*Example A10: N-(2-Butenyl)-4-chlorobenzamide* [III; Ar is 4-ClC$_6$H$_4$, *n* is 0, R is CH$_2$CH=CHCH$_3$] (method A2), m.p. 110–112° C. (fragmented blades and needles from cyclohexane).

*Example A11: N-(n-Butyl)-4-chlorobenzamide* [III; Ar is 4-ClC$_6$H$_4$, *n* is 0, R is CH$_2$CH$_2$CH$_2$CH$_3$] (method A1), m.p. 80–82° C. (needles from cyclohexane).

*Example A12: N-Isobutyl-4-chlorobenzamide* [III; Ar is 4-ClC$_6$H$_4$, *n* is 0, R is CH$_2$CH(CH$_3$)$_2$] (method A1), m.p. 93–95° C. (needles and platelets from cyclohexane).

*Example A13: N-(2-Phenylethyl) - 4 - chlorobenzamide* [III; Ar is 4-ClC$_6$H$_4$, *n* is 0, R is CH$_2$CH$_2$C$_6$H$_5$] (method A1), m.p. 134–136° C. (needles from cyclohexane).

*Example A14: N-Cyclopropylmethyl - 4 - fluorobenzamide* [III; Ar is 4-FC$_6$H$_4$, *n* is 0, R is CH$_2$CH(CH$_2$)$_2$] (method A2), m.p. 87–97° C. (needles from cyclohexane).

*Example A15: N-Allylbenzamide* [III; Ar is C$_6$H$_5$, *n* is 0, R is CH$_2$CH=CH$_2$] (method A1), yellow oil.

*Example A16: N-Allyl-4-bromobenzamide* [III; Ar is 4-BrC$_6$H$_4$, *n* is 0, R is CH$_2$CH=CH$_2$] (method A1), m.p. 92–94° C.

*Example A17: N-(2-Methylbutyl) - 4 - chlorobenzamide* [III; Ar is 4-ClC$_6$H$_4$, *n* is 0, R is CH$_2$CH(CH$_3$)-CH$_2$CH$_3$] (method A1), m.p. 54–64° C.

*Example A18: N-(n-Propyl)benzamide* [III; Ar is C$_6$H$_5$, *n* is 0, R is CH$_2$CH$_2$CH$_3$] (method A1), m.p. 82–84° C.

*Example A19: N-(n-Propyl)-4-iodobenzamide* [III; Ar is 4-IC$_6$H$_4$, *n* is 0, R is CH$_2$CH$_2$CH$_3$] (method A1), m.p. 121–123° C.

*Example A20: N-Cyclopropylmethyl - 4 - iodobenzamide* [III; Ar is 4-IC$_6$H$_4$, *n* is 0, R is CH$_2$CH(CH$_2$)$_2$] (method A2), needles from ethyl acetate.

*Example A21: N-Methyl-4-chlorobenzamide* [III; Ar is 4-ClC$_6$H$_4$, *n* is 0, R is CH$_3$] (method A3), m.p. 153–155° C.

*Example A22: N-(n-Propyl)-2,6-dichlorobenzamide* [III; Ar is 2,6-Cl$_2$C$_6$H$_3$, *n* is 0, R is CH$_2$CH$_2$CH$_3$] (method A1), m.p. 131–133° C. (plates from ether).

*Example A23: N-Isopropyl-4-chlorobenzamide* [III; Ar is 4-ClC$_6$H$_4$, *n* is 0, R is CH(CH$_3$)$_2$] (method A1), m.p. 142–144° C. (needles from ethyl acetate).

*Example A24: N-Cyclopropyl-4-chlorobenzamide* [III; Ar is 4-ClC$_6$H$_4$, *n* is 0, R is CH(CH$_2$)$_2$] (method A2), m.p. 132–133° C. (needles from ethyl acetate-cyclohexane).

*Example A25: N-Isopropylnicotinamide* [III; Ar is 3-pyridyl, *n* is 0, R is CH(CH$_3$)$_2$] (method A1), m.p. 92–93° C. (from hexane).

*Example A26: N-(n-Propyl)-4-nitrobenzamide* [III; Ar is 4-O$_2$NC$_6$H$_4$, *n* is 0, R is CH$_2$CH$_2$CH$_3$], m.p. 102–103.5° C. (from benzene-pentane).

*Example A27: N-(n-Propyl)-4-methoxybenzamide* [III; Ar is 4-CH$_3$OC$_6$H$_4$, *n* is 0, R is CH$_2$CH$_2$CH$_3$], m.p. 62–64° C. (from benzene-pentane).

*Example A28: N-Isopropyl-2-chlorobenzamide* [III; Ar is 2-ClC$_6$H$_4$, *n* is 0, R is CH(CH$_3$)$_2$] (method A1), m.p. 138–140° C.

*Example A29: N-(n-Propyl)-D-methylbenzamide* [III; Ar is 4-CH$_3$C$_6$H$_4$, *n* is 0, R is CH$_2$CH$_2$CH$_3$] (method A1), m.p. 66–67° C.

*Example A30: N-Isopropyl-3-chlorobenzamide* [III; Ar is 3-ClC$_6$H$_4$, *n* is 0, R is CH(CH$_3$)$_2$] (method A1), m.p. 87–89° C.

*Example A31: N-(n-Propyl)-3,4-dichlorobenzamide* [III; Ar is 3, 4-Cl$_2$C$_6$H$_3$, *n* is 0, R is CH$_2$CH$_2$CH$_3$] (method A1), m.p. 60–62° C.

*Example A32: N-Isopropyl-3,4-dichlorobenzamide* [III; Ar is 3,4-Cl$_2$C$_6$H$_3$, *n* is 0, R is CH(CH$_3$)$_2$] (method A1), m.p. 123–125° C.

*Example A33: N-(n-Propyl)-3-methoxy-4-chlorobenzamide* [III; Ar is 3-CH$_3$O-4-ClC$_6$H$_3$], *n* is 0, R is CH$_2$CH$_2$CH$_3$] (method A1), colorless crystals.

*Example A34: N-(n-Propyl)-3,5-dichlorobenzamide* [III; Ar is 3,5-Cl$_2$C$_6$H$_3$, *n* is 0, R is CH$_2$CH$_2$CH$_3$] (method A1), m.p. 203–205° C.

*Example A35:* N-Isopropyl-2,4-dichlorobenzamide [III; Ar is 2, 4-Cl$_2$C$_6$H$_3$, n is 0, R is CH(CH$_3$)$_2$] (method A1), m.p. 121–130° C.

*Example A36:* N-(n-Propyl)-2,3-dichlorobenzamide [III; Ar is 2,4-Cl$_2$C$_6$H$_3$, n is 0, R is CH$_2$CH$_2$CH$_3$] (method A1), m.p. 91–94° C.

*Example A37:* N-Isopropyl-4-trifluoromethoxybenzamide [III; Ar is 4-F$_3$COC$_6$H$_4$, n is 0, R is CH(CH$_3$)$_2$] (method A1), m.p. 100–101° C.

*Example A38:* N-Isopropyl-3,5-dichlorobenzamide [III; Ar is 3,5-Cl$_2$C$_6$H$_3$, n is 0, R is CH(CH$_3$)$_2$] (method A1), m.p. 158–160° C. (needles from chloroform).

*Example A39:* N-(3-Hydroxyproyl)-4-chlorobenzamide [III; Ar is 4-ClC$_6$H$_4$, n is 0, R is CH$_2$CH$_2$CH$_2$OH] (Method A4), m.p. 105–107° C. (colorless prisms from ethyl acetate).

*Example A40:* N-Isopropyl-2,5-dichlorobenzamide [III; Ar is 2,5-Cl$_2$C$_6$H$_3$, n is 0, R is CH(CH$_3$)$_2$] (method A1), m.p. 131–135° C.

*Example A41:* N-Isopropyl-3-nitro-4-chlorobenzamide [III; Ar is 3-O$_2$N-4-ClC$_6$H$_3$, n is 0, R is CH(CH$_3$)$_2$] (method A1), m.p. 110–115° C.

*Example A42:* N-(n-Propyl-)-3-nitrobenzamide [III; Ar is 3-O$_2$NC$_6$H$_4$, n is 0, R is CH$_2$CH$_2$CH$_3$] (method A1), m.p. 72–74° C.

According to the above procedures, 3,4,5-trimethoxybenzoyl chloride, p-methylthiobenzoyl chloride, p-methylsulfoxybenzoyl chloride, p-methylsulfonylbenzoyl chloride, phenylacetyl chloride, 4-chlorophenylacetyl chloride, β-phenylpropionyl chloride, γ-phenylbutyryl chloride, 2-pyridylcarboxylic acid chloride, isonicothinoyl chloride or 3-pyridylacetyl chloride can be interacted with isopropylamine to give, respectively, N-isopropyl-3,4,5-trimethoxybenzamide [III; Ar is (CH$_3$O)$_3$C$_6$H$_2$, n is 0, R is CH(CH$_3$)$_2$], N-isopropyl-4-methylthiobenzamide [III; Ar is 4-CH$_3$SC$_6$H$_4$, n is O, R is CH(CH$_3$)$_2$], N-isopropyl-4-methylsulfoxybenzamide [III; Ar is 4-CH$_3$SOC$_6$H$_4$, n is 0, R is CH(CH$_3$)$_2$], N-isopropyl-4-methylsulfonylbenzamide [III; Ar is 4-CH$_3$SO$_2$C$_6$H$_4$, n is 0, R is CH(CH$_3$)$_2$], N-isopropylphenylacetamide [III; Ar is C$_6$H$_5$, n is 1, R is CH(CH$_3$)$_2$], N - isopropyl-4-chlorophenylacetamide [III; Ar is 4-ClC$_6$H$_4$, n is 1, R is CH(CH$_3$)$_2$], N-isopropyl-β-phenylpropionamide [III; Ar is C$_6$H$_5$, n is 2, R is CH(CH$_3$)$_2$], N-isopropyl-γ-phenylbutyramide [III; Ar is C$_6$H$_5$, n is 3, R is CH(CH$_3$)$_2$], N-isopropyl-2-pyridinecarboxamide [III; Ar is 2-pyridyl, n is 0, R is CH(CH$_3$)$_2$], N-isopropylisonicotinamide [III; Ar is 4-pyridyl, n is 0, R is CH(CH$_3$)$_2$], or N-isopropyl-3-pyridylacetamide [III; Ar is pyridyl, n is 1, R is CH(CH$_3$)$_2$].

*Example A43*

1-(p-Chlorophenylthioacetyl)hexamethylenimine [V; Ar is 4-ClC$_6$H$_4$, n is 1, N=Z is N(CH$_2$)$_6$]

A mixture of 49.4 g. of p-chloroacetophenone, 35 g. of hexamethylenimine, 15.35 g. of sulfur and 75 ml. of dimethylformamide was heated on a steam bath for about twenty hours. The reaction mixture was concentrated to remove the solvent and then shaken with water and ether. The ether layer was separated, dried over anhydrous calcium sulfate and concentrated, and the residue crystallized to give 18.32 g. of 1-(p-chlorophenylthioacetyl)hexamethylenimine, yellow needles, m.p. 83–85° C. when recrystallized from cyclohexane.

By replacing the p-chloroacetophenone in the foregoing preparation by a molar equivalent amount of p-chlorobutyrophenone there can be obtained 1-[γ-(p-chlorophenyl)thiobutyryl]hexamethylenimine [[V; Ar is [4-ClC$_6$H$_4$, n is 3, N=Z is N(CH$_2$)$_6$].

B. BENZIMIDYL CHLORIDE DERIVATIVES AND ANALOGS

*Example B1*

N-Allyl-4-chlorobenzimidyl Chloride [IV; Ar is 4-ClC$_6$H$_4$, n is 0, R is CH$_2$CH=CH$_2$]

Phosphorus pentachloride (47.2 g.) and 250 ml. of benzene were stirred at reflux until the phosphorus pentachloride had dissolved. N-Allyl-4-chlorobenzamide (Example A1) (44.3 g.) was added in portions, and the reaction mixture was stirred at reflux until evolution of hydrogen chloride ceased (about four hours). The mixture was concentrated *in vacuo* to remove the solvent, and the residue was distilled to give 38.68 g. of N-allyl-4-chlorobenzimidyl chloride, b.p. 72–82° C. (0.04 mm.), $n_D^{25}$=1.5727.

According to the foregoing procedure the following compounds were prepared from the compounds of the respective examples under section A.

*Example B2:* N-Cyclopropylmethyl-4-chlorobenzimidyl Chloride [IV; Ar is 4-ClC$_6$H$_4$, n is 0, R is CH$_2$CH(CH$_2$)$_2$], b.p. 81–89° C. (0.03) mm.), $n_D^{25}$=1.570

*Example B3:* N-Ethyl-4-chlorobenzimidyl Chloride [IV; Ar is 4-ClC$_6$H$_4$, n is 0, R is CH$_2$CH$_3$], b.p. 55–57° C. (0.03 mm.), $n_D^{25}$=1.5638.

*Example B4:* N-(2-Chloroethyl-4-chlorobenzimidyl Chloride [IV; Ar is 4-ClC$_6$H$_4$, n is 0, R is CH$_2$CH$_2$Cl], b.p. 151–152° C. (5 mm.), $n_D^{25}$=1.5822.

*Example B5:* N-(n-Propyl)-4-chlorobenzimidyl Chloride [IV; Ar is 4-ClC$_6$H$_4$, n is 0, R is CH$_2$CH$_2$CH$_3$], b.p. 70–74° C. (0.015 mm.), $n_D^{25}$=1.5556.

*Example B6:* N-Allyl-4-fluorobenzimidyl Chloride [IV; Ar is 4-FC$_6$H$_4$, n is 0, R is CH$_2$CH=CH$_2$], b.p. 44–57° C. (0.03 mm.), $n_D25$=1.5385.

*Example B7:* N-Allyl-4-trifluoromethylbenzimidyl Chloride [IV; Ar is 4-F$_3$CC$_6$H$_4$, n is 0, R is CH$_2$CH=CH$_2$], b.p. 44–48° C. (0.12 mm.).

*Example B8:* N-Benzyl-4-chlorobenzimidyl Chloride [IV; Ar is 4-ClC$_6$H$_4$, n is 0, R is CH$_2$C$_6$H$_5$], b.p. 117–142° C. (0.07 mm.).

*Example B9:* N - Cyclohexylmethyl - 4 - chlorobenzimidyl Chloride [IV; Ar is 4-ClC$_6$H$_4$, n is 0, R is

CH$_2$CH(CH$_2$)$_5$], b.p. 126–132° C. (0.01 mm.), $n_D^{25}$=1.5628.

*Example B10:* N-(2-Butenyl)-4-chlorobenzimidyl Chloride [IV; Ar is 4-ClC$_6$H$_4$, n is 0, R is CH$_2$CH=CHCH$_3$], b.p. 90–108° C. (0.35 mm.).

*Example B11:* N-Butyl-4-chlorobenzimidyl Chloride [IV; Ar is 4-ClC$_6$H$_4$, n is 0, R is CH$_2$CH$_2$CH$_2$CH$_3$], b.p. 61–74° C. (0.1 mm.), $n_D^{25}$=1.5487.

*Example B12:* N-Isobutyl - 4 - chlorobenzimidyl Chloride [IV; Ar is 4-ClC$_6$H$_4$, n is 0, R is CH$_2$CH(CH$_3$)$_2$], b.p. 70–78° C. (0.05 mm.), $n_D^{25}$=1.5455.

*Example B13:* N-(2 - Phenylethyl) - 4 - chlorobenzimidyl Chloride [IV; Ar is 4-ClC$_6$H$_4$, n is 0, R is

CH$_2$CH$_2$C$_6$H$_5$], b.p. 112–119° C. (0.04 mm.).

*Example B14:* N-Cyclopropylmethyl-4-fluorobenzimidyl Chloride [IV; Ar is 4-FC$_6$H$_4$, n is 0, R is

CH$_2$CH(CH$_2$)$_2$], b.p. 65–75° C. (0.03 mm.), $n_D^{25}$=1.5385.

*Example B15:* N-Allylbenzimidyl Chloride [IV; Ar is C$_6$H$_5$, n is 0, R is CH$_2$CH=CH$_2$], b.p. 102–105° C. (5 mm.), $n_D^{25}$=1.5575.

*Example B16:* N-Allyl-4-bromobenzimidyl Chloride [IV; Ar is 4-BrC$_6$H$_4$, n is 0, R is CH$_2$CH=CH$_2$], b.p. 97–104° C. (0.35 mm.), $n_D^{25}$=1.5945.

*Example B17:* N-(2 - Methylbutyl) - 4 - chlorobenzimidyl Chloride [IV; Ar is 4-ClC$_6$H$_4$, n is 0, R is

CH$_2$CH(CH$_3$)CH$_2$CH$_3$], b.p. 98–108° C. (0.08 mm.), $n_D^{25}$=1.5430.

*Example B18:* N-(n-Propyl)benzimidyl Chloride [IV; Ar is $C_6H_5$, n is 0, R is $CH_2CH_2CH_3$], b.p. 100–104° C. (5 mm.), $n_D^{25}$=1.5408.

*Example B19:* N-(n-Propyl) - 4 - iodobenzimidyl Chloride [IV; Ar is 4-$IC_6H_4$, n is 0, R is $CH_2CH_2CH_3$], b.p. 115–120° C. (0.3 mm.), $n_D^{25}$=1.6120.

*Example B20:* N-Cyclopropylmethyl - 4 - iodobenzimidyl Chloride [IV; Ar is 4-$IC_6H_4$, n is 0, R is $$CH_2CH(CH_2)_2],$$

yellow solid.

*Example B21:* N - Methyl - 4 - chlorobenzimidyl Chloride [IV; Ar is 4-$ClC_6H_4$, n is 0, R is $CH_3$], b.p. 128–130° C. (17 mm.).

*Example B22:* N-(n-Propyl)-2,6-dichlorobenzimidyl Chloride [IV; Ar is 2,6-$Cl_2C_6H_3$, n is 0, R is $CH_2CH_2CH_3$], colorless oil.

*Example B23:* N-Isopropyl - 4 - chlorobenzimidyl Chloride [IV; Ar is 4-$ClC_6H_4$, n is 0, R is $CH(CH_3)_2$], b.p. 58–69° C. (0.05 mm.), $n_D^{25}$=1.5496.

*Example B24:* N-Cyclopropyl-4-chlorobenzimidyl Chloride [IV; Ar is 4-$ClC_6H_4$, n is 0, R is $CH(CH_2)_2$], b.p. 153–154° C. (6 mm.), $n_D^{25}$=1.5936.

*Example B25:* N-Isopropylnicotinimidyl Chloride [IV; Ar is 3-pyridyl, n is 0, R is $CH(CH_3)_2$], colorless solid.

*Example B26:* N-(n-Propyl)-4-nitrobenzimidyl Chloride [IV; Ar is 4-$O_2NC_6H_4$, n is 0, R is $CH_2CH_2CH_3$], yellow oil.

*Example B27:* N-(n-Propyl)-4-methoxybenzimidyl Chloride [IV; Ar is 4-$CH_3OC_6H_4$, n is 0, R is $CH_2CH_2CH_3$], b.p. 92–111° C. (0.2–0.35 mm.), $n_D^{25}$=1.5555.

*Example B28:* N-Isopropyl-2-chlorobenzimidyl Chloride [IV; Ar is 2-$ClC_6H_4$, n is 0, R is $CH(CH_3)_2$], b.p. 49–56° C. (0.08 mm.), $n_D^{25}$=1.5358.

*Example B29:* N-(n-Propyl)-4-methylbenzimidyl Chloride [IV; Ar is 4-$CH_3C_6H_4$, n is 0, R is $CH_2CH_2CH_3$], b.p. 65–66° C. (0.055 mm.), $n_D^{25}$=1.5410. In this preparation, the phosphorus pentachloride was replaced by thionyl chloride.

*Example B30:* N-Isopropyl-3-chlorobenzimidyl Chloride [IV; Ar is 3-$ClC_6H_4$, n is 0, R is $CH(CH_3)_2$], b.p. 64–69° C. (0.070 mm.), $n_D^{25}$=1.5460.

*Example B31:* N-(n-Propyl)-3,4-dichlorobenzimidyl Chloride [IV; Ar is 3,4-$Cl_2C_6H_3$, n is 0, R is $CH_2CH_2CH_3$], b.p. 94–95° C. (1 mm.), $n_D^{25}$=1.5690.

*Example B32:* N-Isopropyl-3,4-dichlorobenzimidyl Chloride [IV; Ar is 3,4-$Cl_2C_6H_3$, n is 0, R is $CH(CH_3)_2$], b.p. 88–93° C. (0.06–0.065 mm.), $n_D^{25}$=1.5632.

*Example B33:* N-(n-Propyl)-3-methoxy-4-chlorobenzimidyl Chloride [IV; Ar is 3-$CH_3$O-4-$ClC_6H_3$, n is 0, R is $CH_2CH_2CH_3$], b.p. 103–105° C. (0.14 mm.) $n_D^{25}$=1.5624.

*Example B34:* N-(n-Propyl)-3,5-dichlorobenzimidyl Chloride [IV; Ar is 3,5-$Cl_2C_6H_3$, n is 0, R is $CH_2CH_2CH_3$], b.p. 106–109° C. (0.2 mm.), $n_D^{25}$=1.5620.

*Example B35:* N-Isopropyl-2,4-dichlorobenzimidyl Chloride [IV; Ar is 2,4-$Cl_2C_6H_3$, n is 0, R is $CH(CH_3)_2$], b.p. 98–100° C. (0.08 mm.), $n_D^{25}$=1.5492.

*Example B36:* N-(n-Propyl)-2,4-dichlorobenzimidyl Chloride [IV; Ar is 2,4-$Cl_2C_6H_3$, n is 0, R is $CH(CH_3)_2$], b.p. 105–111° C. (0.10 mm.), $n_D^{25}$=1.5566.

*Example B37:* N-Isopropyl-4-trifluoromethoxybenzimidyl Chloride [IV; Ar is 4-$F_3COC_6H_4$, n is 0, R is $CH(CH_3)_2$], b.p. 61–62° C. (0.26 mm.), $n_D^{25}$=1.5720.

*Example B38:* N-Isopropyl-3,5-dichlorobenzimidyl Chloride [IV; Ar is 3,5-$Cl_2C_6H_3$, n is 0, R is $CH(CH_3)_2$], b.p. 61–64° C. (0.010–0.015 mm.), $n_D^{25}$=1.5570.

*Example B39:* N-(3-Chloropropyl) - 4 - chlorobenzimidyl Chloride [IV; Ar is 4-$ClC_6H_4$, n is 0, R is $$CH_2CH_2CH_2Cl],$$

b.p. 102–105° C. (0.085–0.13 mm.), $n_D^{25}$=1.5731.

*Example B40:* N-Isopropyl-2,5-dichlorobenzimidyl Chloride [IV; Ar is 2,5-$Cl_2C_6H_3$, n is 0, R is $CH(CH_3)_2$], b.p. 74° C. (0.060 mm.), $n_D^{25}$=1.5474.

*Example B41:* N-Isopropyl-3-nitro - 4 - chlorobenzimidyl Chloride [IV; Ar is 3-$O_2$N-4-$ClC_6H_3$, n is 0, R is $CH(CH_3)_2$].

*Example B42:* N-(n-Propyl)-3-nitrobenzimidyl Chloride [IV; Ar is 3-$O_2NC_6H_4$, n is 0, R is $CH_2CH_2CH_3$], b.p. 95–109° C. (0.06–0.09 mm.), $n_D^{25}$=1.5603.

Similarly, N-isopropyl-3,4,5-trimethoxybenzamide, N-isopropyl-4-methylthiobenzamide, N - isopropyl-4-methylsulfoxybenzamide, N-isopropyl - 4 - methylsulfonylbenzamide, N-isopropylphenylacetamide, N-isopropyl-4-chlorophenylacetamide, N-isopropyl - β - phenylpropionamide, N - isopropyl-γ-phenylbutyramide, N-isopropyl-2-pyridinecarboxamide, N-isopropylisonicotinamide or N-isopropyl-3-pyridylacetamide can be interacted with phosphorus pentachloride to yield N-isopropyl-3,4,5-trimethoxybenzimidyl chloride [IV; Ar is 3,4,5-$(CH_3O)_3C_6H_2$, n is 0, R is $CH(CH_3)_2$],N - isopropyl - 4 - methylthiobenzimidyl chloride [IV; Ar is 4-$CH_3SC_6H_4$, n is 0, R is $CH(CH_3)_2$], N-isopropyl-4-methylsulfoxybenzimidyl chloride [IV; Ar is 4-$CH_3SOC_6H_4$, n is 0, R is $CH(CH_3)_2$], N-isopropyl-4-methylsulfonylbenzimidyl chloride [IV; Ar is $$4-CH_3SO_2C_6H_4,$$

n is 0, R is $CH(CH_3)_2$], N-isopropylphenylacetimidyl chloride [IV; Ar is $C_6H_5$, n is 1, R is $CH(CH_3)_2$], N-isopropyl - 4 - chlorophenylacetimidyl chloride [IV; Ar is 4-$ClC_6H_4$, n is 1, R is $CH(CH_3)_2$], N-isopropyl-β-phenylpropionimidyl chloride [IV; Ar is $C_6H_5$, n is 2, R is $CH(CH_3)_2$], N-isopropyl - γ - phenylbutyrimidyl chloride [IV; Ar is $C_6H_5$, n is 3, R is $CH(CH_3)_2$], N-isopropyl-2-pyridinecarboximidyl chloride [IV; Ar is 2-pyridyl, n is 0, R is $CH(CH_3)_2$], N-isopropylisonicotinimidyl chloride [IV; Ar is 4-pyridyl, n is 0, R is $(CH(CH_3)_2$], or N-isopropyl-3-pyridylacetimidyl chloride [IV; Ar is 3-pyridyl, n is 1, R is $CH(CH_3)_2$].

C. BENZAMIDINE DERIVATIVES AND ANALOGS

*Example C1*

*1-(N-Allyl-p - chlorobenzimidoyl)hexamethylenimine* [I; Ar is 0-$ClC_6H_4$, n is 0, R is $CH_2CH=CH_2$, N=Z is $N(CH_2)_6$].

A mixture of 36.8 g. of N-allyl-4-chlorobenzimidyl chloride (Example B1) and 35.8 g. of hexamethylenimine in 250 ml. of benzene was heated at reflux for two hours. The reaction mixture was filtered to remove the hexamethylenimine hydrochloride formed, washed with dilute sodium hydroxide and water, dried, and concentrated to remove the solvent. The residue was distilled to give 29.5 g. of 1-(N-allyl-p-chlorobenzimidoyl)hexamethylenimine, b.p. 105–106° C. (0.02 mm.), $n_D^{25}$=1.5638. The free base was converted to its p-toluenesulfonate salt form, colorless prisms, m.p. 167–169° C., when recrystallized from acetone.

By replacing the hexamethylenimine in the foregoing procedure by a molar equivalent amount of heptamethylenimine, octamethylenimine, 3-methylhexamethylenimine, 2 - isopropyl - 5 - methylhexamethylenimine or 2 - methylheptamethylenimine there can be obtained, respectively, 1-(N-allyl-p - chlorobenzimidoyl)heptamethylenimine [I; Ar is 4-$ClC_6H_4$, n is 0, R is $CH_2CH=CH_2$, N=Z is $N(CH_2)_7$], 1-(N-allyl - p - chlorobenzimidoyl)octamethylenimine [I; Ar is 4-$ClC_6H_4$, n is 0, R is $CH_2CH=CH_2$, N=Z is $N(CH_2)_8$], 1-(N-allyl-p-chlorobenzimidoyl)-3-methylhexamethylenimine, 1-(N-allyl-p-chlorobenzimidoyl)-2-isopropyl-5-methylhexamethylenimine, or 1-(N-allyl-p-chlorobenzimidoyl)-2-methylheptamethylenimine.

By replacing the N-allyl-4-chlorobenzimidyl chloride in the foregoing procedure (Example C1) by a molar equivalent amount of N-isopropyl-3,4,5-trimethoxybenzimidyl chloride, N-isopropyl-4-methylthiobenzimidyl chloride, N-isopropyl-4-methylsulfoxybenzimidyl chloride, N-isopropyl-4-methylsulfonylbenzimidyl chloride, N - isopropylphenylacetimidyl chloride, N - isopropyl - 4 - chlorophenylacetimidyl chloride, N-isopropyl-β-phenylpropionimidyl chloride, N-isopropyl-γ-phenylbutyrimidyl chloride, N-isopropyl-2-pyridinecarboximidyl chloride, N-isopropylisonicotinimidyl chloride, or N-isopropyl-3-pyridylacetimidyl chloride there can be obtained, respectively, 1 - (N - isopropyl - 3,4,5 - trimethoxybenzimidoyl) hexamethylenimine [I; Ar is 3,4,5-$(CH_3O)_3C_6H_2$, $n$ is 0, R is $CH(CH_3)_2$, N=Z is $N(CH_2)_6$], 1-(N-isopropyl-4-methylthiobenzimidoyl)hexamethylenimine [I; Ar is 4-$CH_3SC_6H_4$, $n$ is 0, R is $CH(CH_3)_2$, N=Z is $N(CH_2)_6$], 1 - (N - isopropyl - 4 - methylsulfoxybenzimidoyl)hexamethylenimine [I; Ar is 4-$CH_3SOC_6H_4$, $n$ is 0, R is $CH(CH_3)_2$, N=Z is $N(CH_2)_6$], 1-(N-isopropyl-4-methylsulfonylbenzimidoyl)hexamethylenimine [I; Ar is 4-$CH_3SO_2C_6H_4$, $n$ is 0, R is $CH(CH_3)_2$, N=Z is $N(CH_2)_6$], 1-(N-isopropylphenacetimidoyl)hexamethylenimine [I; Ar is $C_6H_5$, $n$ is 1, R is $CH(CH_3)_2$, N=Z is $N(CH_2)_6$], 1-(N-isopropyl-4-chlorophenylacetimidoyl) hexamethylenimine [I; Ar is 4-$ClC_6H_4$, $n$ is 1, R is $CH(CH_3)_2$, N=Z is $N(CH_2)_6$], 1-(N-isopropyl-β-phenylpropionimidoyl)hexamethylenimine [I; Ar is $C_6H_5$, $n$ is 2, R is $CH(CH_3)_2$, N=Z is $N(CH_2)_6$], 1-(N-isopropyl-γ-phenylbutyrimidoyl)hexamethylenimine [I; Ar is $C_6H_5$, $n$ is 3, R is $CH(CH_3)_2$, N=Z is $N(CH_2)_6$], 1-(N-isopropyl - 2 - pyridinecarboximidoyl)hexamethylenimine [I; Ar is 2-pyridyl, $n$ is 0, R is $CH(CH_3)_2$, N=Z is $N(CH_2)_6$], 1-(N-isopropylisonicotinimidoyl)hexamethylenimine [I; Ar is 4-pyridyl, $n$ is 0, R is $CH(CH_3)_2$, N=Z is $N(CH_2)_6$], or 1-(N-isopropyl-3-pyridylacetimidoyl) hexamethylenimine [I; Ar is 3-pyridyl, $n$ is 1, R is $CH(CH_3)_2$, N=Z is $N(CH_2)_6$].

Similarly were prepared the following compounds:

*Example C2:* 1-(N-Cyclopropylmethyl-p-chlorobenzimidoyl)hexamethylenimine [I; Ar is 4-$ClC_6H_4$, $n$ is 0, R is $CH_2CH(CH_2)_2$, N=Z is $N(CH_2)_6$] (from compound of Example B2 and hexamethylenimine), b.p. 70–72° C. (0.01 mm.), colorless needles, m.p. 35–40° C.; p-toluenesulfonate salt form, m.p. 115.5–118° C., colorless prisms from isopropyl acetate.

*Example C3:* 1 - (N - Ethyl - p - chlorobenzimidoyl)hexamethylenimine [I; Ar is 4-$ClC_6H_4$, $n$ is 0, R is $CH_2CH_3$, N=Z is $N(CH_2)_6$] (from compound of Example B3 and hexamethylen), p - toluenesulfonate salt form, m.p. 183–187° C., colorless blades from acetone-acetonitrile.

*Example C4:* 1-[N-(n-Propyl)-p-chlorobenzimidoyl] hexamethylenimine [I; Ar is 4-$ClC_6H_4$, $n$ is 0, R is $CH_2CH_2CH_3$, N=Z is $N(CH_2)_6$] (from compound of Example B5 and hexamethylenimine), b.p. 94–106° C. (0.04 mm.); p-toluenesulfonate salt form, m.p. 143–144° C., colorless prisms from acetone.

*Example C5:* 1 - (N - Allyl - p - fluorobenzimidoyl)hexamethylenimine [I; Ar is 4-$FC_6H_4$, $n$ is 0, R is $CH_2CH=CH_2$, N=Z is $N(CH_2)_6$] (from compound of Example B6 and hexamethylenimine), b.p. 86–88° C. (0.03 mm.), $n_D^{25}$=1.5395; p-toluenesulfonate salt form, m.p. 125–126° C., colorless needles from acetone-ether.

*Example C6:* 1-(N-Allyl-p-trifluoromethylbenzimidoyl) hexamethylenimine [I; Ar is 4-$F_3CC_6H_4$, $n$ is 0, R is $CH_2CH=CH_2$, N=Z is $N(CH_2)_6$] (from compound of Example B7 and hexamethylenimine), b.p. 86–88° C. (0.03 mm.), $n_D^{25}$=1.5395; p-toluenesulfonate salt form, m.p. 164–169° C., colorless needles from acetone-ether.

*Example C7:* 1-(N-Benzyl-p-chlorobenzimidoyl)hexamethylenimine [I; Ar is 4-$ClC_6H_4$, $n$ is 0, R is $CH_2C_6H_5$, N=Z is $N(CH_2)_6$] (from compound of Example B8 and hexamethylenimine), b.p. 133–137° C. (0.15 mm.), $n_D^{25}$=1.5923, colorless dendrites, m.p. 58–68° C.

*Example C8:* 1-(N-Cyclohexylmethyl-p-chlorobenzimidoyl)hexamethylenimine [I; Ar is 4-$ClC_6H_4$, $n$ is 0, R is $CH_2CH(CH_2)_5$, N=Z is $N(CH_2)_6$] (from compound of Example B9 and hexamethylenimine), b.p. 151–152° C. (0.32 mm.), m.p. 42–60° C. (colorless spherulites).

*Example C9:* 1-[N-(2-Butenyl)-p-chlorobenzimidoyl] hexamethylenimine [I; Ar is 4-$ClC_6H_4$, $n$ is 0, R is $CH_2CH=CHCH_3$, N=Z is $N(CH_2)_6$] (from compound of Example B10 and hexamethylenimine), b.p. 114–121° C. (0.07 mm.), $n_D^{25}$=1.5588, pale yellow oil.

*Example C10:* 1-[N-(n-Butyl)-p-chlorobenzimidoyl]hexamethylenimine [I; Ar is 4-$ClC_6H_4$, $n$ is 0, R is $CH_2CH_2CH_2CH_3$, N=Z is $N(CH_2)_6$] (from compound of Example B11 and hexamethylenimine), b.p. 123–126° C. (0.1 mm.), $n_D^{25}$=1.5443, pale yellow oil.

*Example C11:* 1-(N-Isobutyl-p-chlorobenzimidoyl)hexamethylenimine [I; Ar is 4-$ClC_6H_4$, $n$ is 0, R is $CH_2CH(CH_3)_2$, N=Z is $N(CH_2)_6$] (from compound of Example B12 and hexamethylenimine), b.p. 107–112° C. (0.035 mm.), $n_D^{25}$=1.5435; p-toluenesulfonate salt form, m.p. 75–87° C., prisms from isopropyl acetate.

*Example C12:* 1-[N-(2-Phenylethyl)-p-chlorobenzimidoyl]hexamethylenimine [I; Ar is 4-$ClC_6H_4$ $n$ is 0, R is $CH_2CH_2C_6H_5$, N=Z is $N(CH_2)_6$] (from compound of Example B13 and hexamethylenimine), hydrochloride salt form, m.p. 186–188° C., colorless prisms from acetone.

*Example C13:* 1-(N-Cyclopropylmethyl-p-fluorobenzimidoyl)hexamethylenimine [I; Ar is 4-$FC_6H_4$, $n$ is 0, R is $CH_2CH(CH_2)_2$, N=Z is $N(CH_2)_6$] (from compound of Example B14 and hexamethylenimine), b.p. 120–133° C. (0.12 mm.), $n_D^{25}$=1.5380, colorless oil.

*Example C14:* 1-(N-Allyl - 4 - bromobenzimidoyl)hexamethylenimine [I; Ar is 4-$BrC_6H_4$, $n$ is 0, R is $CH_2CH=CH_2$, N=Z is $N(CH_2)_6$] (from compound of Example B16 and hexamethylenimine), b.p. 127–144° C. (0.015 mm.), yellow oil; $n_D^{25}$=1.5783.

*Example C15:* 1-[N-(2-Methylbutyl)-4-chlorobenzimidoyl]hexamethylenimine [I; Ar is 4-$ClC_6H_4$, $n$ is 0, R is $CH_2CH(CH_3)CH_2CH_3$, N=Z is $N(CH_2)_6$] (from compound of Example B17 and hexamethylenimine), b.p. 143–155° C. (0.03 mm.), pale yellow oil; $n_D^{25}$=1.5935.

*Example C16:* 1-[N-(n-Propyl)-4-iodobenzimidoyl]hexamethylenimine [I; Ar is 4-$IC_6H_4$, $n$ is 0, R is $CH_2CH_2CH_3$, N=Z is $N(CH_2)_6$] (from compound of Example B19 and hexamethylenimine), hydrochloride salt, m.p. 225–227° C., colorless prisms from acetonitrile and acetonitrile-isopropyl alcohol.

*Example C17:* 1-(N-Cyclopropylmethyl-4-iodobenzimidoyl)hexamethylenimine [I; Ar is 4-$IC_6H_4$, $n$ is 0, R is $CH_2CH(CH_2)_2$, N=Z is $N(CH_2)_6$] (from compound of Example B20 and hexamethylenimine), hydrochloride salt, m.p. 240–242° C., colorless needles from ethyl acetate-acetonitrile.

*Example C18:* 1-(N-Methyl-4-chlorobenzimidoyl)hexamethylenimine [I; Ar is 4-$ClC_6H_4$, $n$ is 0, R is $CH_3$, N=Z is $N(CH_2)_6$] (from compound of Example B21 and hexamethylenimine), b.p. 110–118° C. (0.03 mm.), $n_D^{25}$=1.5665; solidified to waxy dendrite needles.

*Example C19:* 1-[N-(n-Propyl)-2,6-dichlorobenzimidoyl] hexamethylenimine [I; Ar is 2,6-$Cl_2C_6H_3$, $n$ is 0, R is $CH_2CH_2CH_3$, N=Z is $N(CH_2)_6$] (from compound of Example B22 and hexamethylenimine), p-toluenesulfonate salt, m.p. 122–127° C., colorless massive prisms from ethyl acetate-acetonitrile.

*Example C20:* 1-(N-Isopropyl-4-chlorobenzimidoyl)hexamethylenimine [I; Ar is 4-$ClC_6H_4$, $n$ is 0, R is $CH(CH_3)_2$, N=Z is $N(CH_2)_6$] (from compound of Example B23 and hexamethylenimine), hydrochloride salt, m.p. 241–243° C., colorless prisms from acetonitrile-ether.

*Example C21:* 1-(N-Cyclopropyl - 4 - chlorobenzimidoyl) hexamethylenimine [I; Ar is 4-$ClC_6H_4$, $n$ is 0, R is $CH(CH_2)_2$, N=Z is $N(CH_2)_6$] (from compound of Example B24 and hexamethylenimine), p-toluenesulfonate salt, m.p. 155–157° C., colorless prisms from acetone-methanol.

*Example C22:* 1-(*N-Isopropylnicotinimidoyl*)*hexamethylenimine* [I; Ar is 3-pyridyl, n is 0, R is CH(CH₃)₂, N=Z is N(CH₂)₆] (from compound of Example B25 and hexamethylenimine), b.p. 85–87° C. (0.15 mm.), colorless waxy spherulites.

*Example C23:* 1-[*N-(n-Propyl)-4-nitrobenzimidoyl*]*hexamethylenimine* [I; Ar is 4-O₂NC₆H₄, n is 0, R is CH₂CH₂CH₃, N=Z is N(CH₂)₆] (from compound of Example B26 and hexamethylenimine), hydrochloride salt, m.p. 189–191° C., pale yellow prisms from acetone.

*Example C24:* 1-[*N-(n-Propyl)-4-methoxybenzimidoyl*] *hexamethylenimine* [I; Ar is 4-CH₃OC₆H₄, n is 0, R is CH₂CH₂CH₃, N=Z is N(CH₂)₆] (from compound of Example B27 and hexamethylenimine), hydrochloride salt, m.p. 158–159° C., colorless microprisms from ethyl acetate.

*Example C25:* 1-(*N-Isopropyl-2-chlorobenzimidoyl*)*hexamethylenimine* [I; Ar is 2-ClC₆H₄, n is 0, R is CH(CH₃)₂, N=Z is N(CH₂)₆] (from compound of Example B28 and hexamethylenimine), b.p. 104–105° C. (0.050 mm.), $n_D^{25}$=1.5422.

*Example C26:* 1-(*N-Isopropyl-3-chlorobenzimidoyl*)*hexamethylenimine* [I; Ar is 3-ClC₆H₄, n is 0, R is CH(CH₃)₂, N=Z is N(CH₂)₆] (from compound of Example B30 and hexamethylenimine), b.p. 114–119° C. (0.045–0.050 mm.), $n_D^{25}$=1.5418; hydrochloride salt, m.p. 175–178° C., colorless prisms from ethyl acetate.

*Example C27:* 1-[*N-(n-Propyl)-3,4-dichlorobenzimidoyl*] *hexamethylenimine* [I; Ar is 3,4-Cl₂C₆H₃, n is 0, R is CH₂CH₂CH₃, N=Z is N(CH₂)₆] (from compound of Example B31 and hexamethylenimine), hydrochloride salt, m.p. 181–184° C. (dec.), colorless flat needles from ethyl acetate.

*Example C28:* 1-(*N-Isopropyl-3,4-dichlorobenzimidoyl*) *hexamethylenimine* [I; Ar is 3,4-Cl₂C₆H₃, n is 0, R is CH(CH₃)₂, N=Z is N(CH₂)₆] (from compound of Example B32 and hexamethylenimine), hydrochloride salt, m.p. 172–174° C., colorless needles from acetone.

*Example C29:* 1-[*N-(n-Propyl)-3-methoxy-4-chlorobenzimidoyl*]*hexamethylenimine* [I; Ar is 3-CH₃O-4-ClC₆H₃, n is 0, R is CH₂CH₂CH₃, N=Z is N(CH₂)₆] (from compound of Example B33 and hexamethylenimine), hydrochloride salt, m.p. 164–165° C., colorless needles from ethyl acetate.

*Example C30:* 1-[*N-(n-Propyl)-3,5-dichlorobenzimidoyl*] *hexamethylenimine* [I; Ar is 3,5-Cl₂C₆H₃, n is 0, R is CH₂CH₂CH₃, N=Z is N(CH₂)₆] (from compound of Example B34 and hexamethylenimine), hydrochloride salt, m.p. 115–116° C., colorless prisms from acetone-acetonitrile-ether.

*Example C31:* 1-(*N-Isopropyl-2,4-dichlorobenzimidoyl*) *hexamethylenimine* [I; Ar is 2,4-Cl₂C₆H₃, n is 0, R is CH(CH₃)₂, N=Z is N(CH₂)₆] (from compound of Example B35 and hexamethylenimine), hydrochloride salt, m.p. 220–223° C., colorless crystals from acetone-acetonitrile.

*Example C32:* 1-[*N-(n-Propyl)-2,4-dichlorobenzimidoyl*] *hexamethylenimine* [I; Ar is 2,4-Cl₂C₆H₃, n is 0, R is CH₂CH₂CH₃, N=Z is N(CH₂)₆] (from compound of Example B36 and hexamethylenimine), hydrochloride salt, m.p. 126–120° C., colorless crystals from ethyl acetate.

*Example C33:* 1-(*N-Isopropyl-4-trifluoromethoxybenzimidoyl*)*hexamethylenimine* [I; Ar is 4-F₃COC₆H₄, n is 0, R is CH(CH₃)₂, N=Z is N(CH₂)₆] (from compound of Example B37 and hexamethylenimine), p-toluenesulfonate salt, m.p. 154–156° C., colorless massive prisms from acetone-ether.

*Example C34:* 1-(*N-Isopropyl-3,5-dichlorobenzimidoyl*) *hexamethylenimine* [I; Ar is 3,5-Cl₂C₆H₃, n is 0, R is CH(CH₃)₂, N=Z is N(CH₂)₆] (from compound of Example B38 and hexamethylenimine), hydrochloride salt, m.p. 205–207° C., colorless prismatic blades from acetone-ether.

*Example C35*

(a) *1-[N-(2-Chloroethyl) - 4 - chlorobenzimidoyl]hexamethylenimine* [I; Ar is 4-ClC₆H₄, n is 0, R is CH₂CH₂Cl, N=Z is N(CH₂)₆] (from compound of Example B4 and hexamethylenimine), m.p. 68–70° C. (from n-pentane).

(b) *1-[N-(2-acetoxyethyl) - 4 - chlorobenzimidoyl]hexamethylenimine* [I; Ar is 4-ClC₆H₄, n is 0, R is CH₂CH₂OCOCH₃, N=Z is N(CH₂)₆].

A mixture of 54.69 g. of 1-[N-(2-chloroethyl)-4-chlorobenzimidoyl]hexamethylenimine, 24.6 g. of potassium acetate and 200 ml. of dimethylformamide was stirred at reflux for about sixteen hours. The reaction mixture was filtered and the filtrate evaporated to remove the solvent. The residue was partitioned between water and ether, and the ether layer was washed with water, dried and concentrated. The residue was treated with 24.2 g. of cyclohexanesulfamic acid in acetone and the product precipitated with ether and n-pentane to give 1-[N-(2-acetoxyethyl) - 4 - chlorobenzimidoyl]hexamethylenimine in the form of its cyclohexanesulfamate salt, m.p. 110–112° C., colorless needles from isopropyl acetate.

*Example C36*

*1 - [N-(n - Propyl) - 2 - nitro - 4 - chlorobenzimidoyl] hexamethylenimine* [I; Ar is 2-O₂N-4-ClC₆H₃, n is 0, R is CH₂CH₂CH₃, N=Z is N(CH₃)₆]

A solution of 27.88 g. of 1 - [N - (n - propyl) - 4-chlorobenzimidoyl]hexamethylenimine in 150 ml. of concentrated sulfuric acid was cooled and 11 g. of potassium nitrate was added. The mixture was allowed to warm to room temperature and additional sulfuric acid was added until all solid dissolved. The reaction mixture was poured into one liter of ice and an excess of 35% sodium hydroxide. The product was extracted with ether and the ether extracts were dried and concentrated. The residue was treated with hydrogen chloride gas to give 1-[N-(n-propyl) - 2 - nitro - 4 - chlorobenzimidoyl]hexamethylenimine in the form of its hydrochloride salt, m.p. 181–183° C. and 194–196° C. (polymorphism), pale yellow platelets from ethyl acetate and acetone.

*Example C37*

*1 - (N - Isopropyl - 4 - chlorophenylacetimidoyl)hexamethylenimine*[I; Ar is 4-ClC₆H₄, n is 1, R is CH(CH₃)₂, N=Z is N(CH₂)₆].

A mixture of 20.1 g. of 1-(*p*-chlorophenylthioacetyl) hexamethylenimine (Example A43), 20.35 g. of mercuric chloride, 250 ml. of isopropylamine and 500 ml. of methanol was stirred at room temperature for about sixteen hours. The reaction mixture was treated with activated charcoal, filtered, and the filtrate concentrated to remove the solvent. The residue was treated with dilute sodium hydroxide and extracted with ether. The ether extracts were dried and concentrated to give 1-(N-isopropyl-4 - chlorophenylacetimidoyl)hexamethylenimine, obtained also in the form of its cyclohexanesulfamate salt, m.p. 150–152° C., colorless needles from acetonitrile-acetone.

*Example C38*

*1 - [N - (n - Propyl) - 4 - chlorophenylacetimidoyl] hexamethylenimine* [I; A ris 4-ClC₆H₄, n is 1, R is CH₂CH₂CH₃, N=Z is N(CH₂)₆] was prepared from 1 - (*p* - chlorophenylthioacetyl)hexamethylenimine (Example A43) and n-propylamine according to the procedure of Example C37, and was obtained in the form of its hydrochloride salt, m.p. 190–192° C., colorless needles from acetonitrile.

Example C39

*1 - [N - (n - Propyl) - 4 - aminobenzimidoyl]hexamethylenimine*[I; Ar is 4-H$_2$NC$_6$H$_4$, n is 0, R is CH$_2$CH$_2$CH$_3$, N=Z is N(CH$_2$)$_6$]

was prepared by hydrogenation of 1 - [N - (n - propyl) - 4 - nitrobenzimidoyl]hexamethylenimine (Example C23) in 300 ml. of methanol in the presence of 0.5 g. of platinum oxide catalyst. Reduction was complete in ten minutes. The mixture was filtered and hydrogen chloride gas was passed through the filtrate. The solution was concentrated to remove the solvent, and the residue was recrystallized from ethanol to give 1 - [N - (n - propyl) - 4 - aminobenzimidoyl]hexamethylenimine in the form of its dihydrochloride salt, yellow prisms, m.p. 218–220° C.

Example C40

(a) *1 - [N - (3 - Chloropropyl) - 4 - chlorobenzimidoyl]hexamethylenimine*[I; Ar is 4-ClC$_6$H$_4$, n is 0, R is CH$_2$CH$_2$CH$_2$Cl, N=Z is N(CH$_2$)$_6$] (from compound of Example B39 and hexamethylenimine), yellow oil.

(b) *1 - [N - (3 - Acetoxypropyl)-4-chlorobenzimidoyl]hexamethylenimine* [I; Ar is 4-ClC$_6$H$_4$, n is 0, R is CH$_2$CH$_2$CH$_2$OCOCH$_3$, N=Z is N(CH$_2$)$_6$] was prepared from 1 - [N - (3 - chloropropyl) - 4 - chlorobenzimidoyl]hexamethylenimine and potassium acetate in dimethylformamide according to the procedure of Example C35(b). There was thus obtained 1-[N-(3-acetoxypropyl) - 4 - chlorobenzimidoyl]hexamethylenimine in the form of its p- toluenesulfonate salt, m.p. 144–147° C., colorless prisms from ethyl acetate.

Example C41

*1 - [N - (3 - Hydroxypropyl) - 4 - chlorobenzimidoyl]hexamethylenimine* [I; Ar is 4-ClC$_6$H$_4$, n is 1, R is CH$_2$CH$_2$CH$_2$OH, N=Z is N(CH$_2$)$_6$]

A mixture of 31.4 g. of 1 - [N - (3 - acetoxypropyl)-4 - chlorobenzimidoyl]hexamethylenimine p - toluenesulfonate, 150 ml. of methanol and a few crystals of p-toluenesulfonic acid monohydrate was refluxed for one week. The reaction mixture was concentrated to remove the solvent, and the residue was triturated with ether and recrystallized from ether-acetone to give 1 - [N - (3 - hydroxypropyl) - 4 - chlorobenzimidoyl]hexamethylenimine in the form of colorless massive prisms, m.p. 129–130° C.

Example C42

*1 - (N - Isopropyl - 2,5 - dichlorobenzimidoyl)hexamethylenimine*[I; Ar is 2,5-Cl$_2$C$_6$H$_3$, n is 0, R is CH(CH$_3$)$_2$, N=Z is N(CH$_2$)$_6$] (from compound of Example B40 and hexamethylenimine), hydrochloride salt, m.p. 184–186° C., colorless prisms from acetone-ether.

Example C43

*1 - (N - Isopropyl - 3 - nitro - 4 - chlorobenzimidoyl)hexamethylenimine*[I; Ar is 3-O$_2$N-4-ClC$_6$H$_3$, n is 0, R is CH(CH$_3$)$_2$, N=Z is N(CH$_2$)$_6$] (from compound of Example B41 and hexamethylenimine), p-toluenesulfonate salt, m.p. 205–208° C., yellow prisms from acetone-ether.

Example C44

*1 - [N - (n - Propyl) - 3 - nitrobenzimidoyl]hexamethylenimine*[I; Ar is 3-O$_2$NC$_6$H$_4$, n is 0, R is CH$_2$CH$_2$CH$_3$, N=Z is N(CH$_2$)$_6$] (from compound of Example B42 and hexamethylenimine), cyclohexanesulfamate salt, m.p. 134–136° C. (from acetone-ether).

Example C45

*1 - [N - (n - Propyl) - 3 - chlorobenzimidoyl]hexamethylenimine* [I; Ar is 3-ClC$_6$H$_4$, n is 0, R is CH$_2$CH$_2$CH$_3$, N=Z is N(CH$_2$)$_6$] was prepared by reacting N - (n-propyl) - 3 - chlorobenzamide with phosphorus pentachloride, and reacting the resulting N - (n -propyl)- 3 - chlorobenzimidyl chloride with hexamethylenimine. There was obtained 1 - [N - (n - propyl) - 3 - chlorobenzimidoyl]hexamethylenimine in the form of its cyclohexanesulfamate salt, m.p. 149–150° C., massive colorless prisms from acetone-methanol.

Example C46

*1 - [N - (n - Propyl) - 3 - amino - 4 - chlorobenzimidoyl]hexamethylenimine*[I; Ar is 3-NH$_2$-4-ClC$_6$H$_4$, n is 0, R is CH$_2$CH$_2$CH$_3$, N=Z is N(CH$_2$)$_6$] was prepared by reacting N (n - propyl) - 3 - nitro - 4 - chlorobenzamide with phosphorus pentachloride, reacting the resulting N - (n - propyl) - 3 - nitro - 4 - chlorobenzimidyl chloride with hexamethylenimine, and catalytically hydrogenating the 1-[N - (n - propyl)-3-nitro-4 - chlorobenzimidoyl]hexamethylenimine thus obtained. There was obtained 1 - [N - (n- propyl) - 3-amino - 4 - chlorobenzimidoyl]hexamethylenimine in the form of its cyclohexanesulfamate salt, yellow crystals, m.p. 149–153° C.

Example C47

*1 - [N - (n-Propyl) - 3 - acetylamino - 4 - chlorobenzimidoyl]hexamethylenimine*[I; Ar is 3-CH$_3$CONH-4-ClC$_6$H$_3$, n is 0, R is CH$_2$CH$_2$CH$_3$, N=Z is N(CH$_3$)$_6$]

A mixture of 8.75 g. of 1 - [N - (n - propyl) - 3-amino - 4 - chlorobenzimidoyl]hexamethylenimine (Example C46) in the form of its cyclohexanesulfamate salt, 100 ml. of acetic anhydride and 3 drops of concentrated sulfuric acid was stirred at room temperature for about sixteen hours. The mixture was flash evaporated and the residue triturated with ether. The crystalline product was collected and recrystallized from acetonitrile-methanol to give 1.75 g. of 1 - [N - (n - propyl) - 3 - acetylamino - 4-chlorobenzimidoyl]hexamethylenimine, m.p. 175–177° C.

Example C48

*1 - [N-(n - Propyl)-4-chloro-3-bis(methylsulfonyl)aminobenzimidoyl]hexamethylenmine* [I; Ar is 3-(CH$_3$SO$_2$)$_2$N-4-ClC$_6$H$_3$, n is 0, R is CH$_2$CH$_2$CH$_3$, N=Z is N(CH$_2$)$_6$].

A mixture of 24.4 g. of 1-[N-(n-propyl)-3-amino-4-chlorobenzimidoyl]hexamethylenimine (Example C46), 16.96 g. of methanesulfonyl chloride and 250 ml. of dry pyridine was stirred at room temperature for about sixteen hours. The mixture was flash evaporated and the crystalline product isolated and recrystallized from methanol-ether to give 9.88 g. of 1-[N-(n-propyl)-4-chloro-3-bis (methylsulfonyl) aminobenzimidoyl] hexamethylenimine, colorless prisms, m.p. 196–198° C.

Example C49

(a) *4-Chloro-3 - tertiary-butylsulfamylbenzoic acid*, m.p. 212–213° C., was prepared from 3-chlorosulfonyl-4-chlorobenzoic acid and tertiary-butylamine in chloroform solution.

(b) *4-Chloro - 3 - tertiary-butylsulfamylbenzoyl chloride* was prepared from 4-chloro-3-tertiary-butylsulfamoylbenzoic acid and thionyl chloride in dimethylformamide solution.

(c) *4 - Chloro-3-tertiary-butylsulfamyl-N-(n-propyl)benzamide* was prepared from 4-chloro-3-tertiary-butylsulfamoylbenzoyl chloride and n-propylamine in chloroform, and had the m.p. 146–147° C. when recrystallized from isopropyl acetate.

(d) *N-(n-Propyl)-4-chloro - 3 - tertiary - butylsulfamylbenzimidyl chloride* was prepared from the benzamide of part (c) and phosphorus pentachloride.

(e) *1-[N-(n - Propyl) - 4 - chloro - 3 - tertiary-butylsulfamylbenzimidoyl]hexamethylenimine* [I; Ar is 3-(CH$_3$)$_3$CNHSO$_2$-4-ClC$_6$H$_3$, n is 0, R is CH$_2$CH$_2$CH$_3$, N=Z is N(CH$_2$)$_6$] was prepared from the benzimidyl chloride of part (d) and hexamethylenimine, and was obtained in the form of its cyclohexanesulfamate salt, colorless prisms, m.p. 87–97° C.

Example C50

1-[N-(n-Propyl) - 4 - chloro - 3 - sulfamylbenzimidoyl] hexamethylenimine [I; Ar is 3-H$_2$NSO$_2$-4-ClC$_6$H$_3$, n is 0, R is CH$_2$CH$_2$CH$_3$, N=Z is N(CH$_2$)$_6$] was obtained in the form of its hydrochloride salt, m.p. 266–269° C., massive colorless prisms from 95% ethanol by treating 1 - [N-(n-propyl)-4-chloro - 3 - tertiary-butylsulfamylbenzimidoyl]hexamethylenimine with concentrated hydrochloric acid, stirred at room temperature for about sixteen hours.

Example C51

(a) N-(n-Propyl) - 4 - chloro - 3 - dimethylsulfamylbenzamide, m.p. 89—91° C., was prepared from 4-chloro-3-dimethylsulfamylbenzoyl chloride and n-propylamine.

(b) N-(n - Propyl) - 4 - chloro-3-dimethylsulfamylbenzimidyl chloride was prepared from N - (n-propyl)-4-chloro-3 - dimethylsulfamylbenzamide and phosphorus pentachloride.

(c) 1-[N-(n-Propyl) - 4 - chloro-3-dimethysulfamylbenzimidoyl]hexamethylenimine [I; Ar is 3-(CH$_3$)$_2$NSO$_2$-4-ClC$_6$H$_3$, n is 0, R is CH$_2$CH$_2$CH$_3$, N=Z is N(CH$_2$)$_6$] was prepared from the benzimidyl chloride of part (b) and hexamethylenimine, and was obtained in the form of its cyclohexanesulfamate salt, massive colorless prisms, m.p. 162–164° C. when recrystallized from acetone-isopropyl alcohol-ether solution.

I claim:

1. A compound of the formula

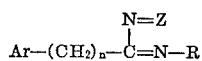

wherein Ar is unsubstituted pyridyl or phenyl substituted by from one to three substituents selected from the group consisting of halogen, trifluoromethyl, trifluoromethoxy, nitro, lower-alkoxy, lower-alkylthio, lower-alkylsulfoxy, lower-alkylsulfonyl, amino, lower - alkanoylamino, bis(methylsulfonyl)amino, sulfamyl, lower - alkylsulfamyl, and di-lower-alkylsulfamyl; n is 0; N=Z is unsubstituted polymethylenimino having from 7 to 9 ring members; and R is lower-alkyl, lower-alkenyl, cycloalkyl of 3–6 ring members, cycloalkyl-lower-alkyl wherein cycloalkyl has 3–6 ring members, phenyl-lower - alkyl, hydroxy-lower-alkyl, or lower-alkanoyloxy-lower-alkyl.

2. A compound according to Claim 1 wherein n is 0, N=Z is hexamethylenimino, and R is lower-alkyl.

3. 1-(N-Lower-alkenyl-p-halobenzimidoyl)hexamethylenimine, according to Claim 1 wherein Ar is p-halophenyl, n is 0, N=Z is hexamethylenimino and R is lower-alkenyl.

4. 1 - (N-Cyclopropylmethyl-p-halobenzimidoyl)hexamethylenimine, according to Claim 1 wherein Ar is p-halophenyl, n is 0, N=Z is hexamethylenimino and R is cyclopropylmethyl.

5. 1 - (N-Lower-alkyl-p-halobenzimidoyl)hexamethylenimine, according to Claim 2 wherein Ar is p-halophenyl.

6. 1 - (N-Phenyl-lower-alkyl-p-chlorobenzimidoyl)hexamethylenimine, according to Claim 1 wherein Ar is p-chloroprenyl, n is 0, N=Z is hexamethylenimino and R is phenyl-lower-alkyl.

7. 1 - (N-Lower-alkyl-2-nitro-4-chlorobenzimidyl)hexamethylenimine, according to Claim 1 wherein Ar is 2-nitro-4-chlorophenyl, n is 0, N=Z is hexamethylenimino and R is lower-alkyl.

8. 1 - (N-Lower-alkyl-4 - methoxybenzimidoyl)hexamethylenimine, according to Claim 2 wherein Ar is p-methoxyphenyl.

9. 1 - (N-Lower-alkyl - 2 - chlorobenzimidoyl)hexamethylenimine, according to Claim 2 wherein Ar is o-chlorophenyl.

10. 1 - (N - Lower-alkylnicotinimidoyl)hexamethylenimine, according to Claim 1 wherein Ar is 3-pyridyl, n is 0, N=Z is hexamethylenimino and R is lower-alkyl.

11. 1 - (N - Lower-alkyl-4 - nitrobenzimidoyl)hexamethylenimine, according to Claim 2 wherein Ar is p-nitrophenyl.

12. 1-(N - Lower - alkyl-3-chlorobenzimidoyl)hexamethylenimine, according to Claim 2 wherein Ar is m-chlorophenyl.

13. 1 - (N - Lower-alkyl-3,4-dichlorobenzimidoyl)hexamethylenimine, according to Claim 2 wherein Ar is 3,4-dichlorophenyl.

14. 1 - (N - lower-alkyl-3-methoxy-4-chlorobenzimidoyl)hexamethylenimine, according to Claim 2 wherein Ar is 3-methoxy-4-chlorophenyl.

15. 1 - (N-Lower-alkyl-3,5-dichlorobenzimidoyl)hexamethylenimine, according to Claim 2 wherein Ar is 3,5-dichlorophenyl.

16. 1 - (N-Lower-alkyl-2,4-dichlorobenzimidoyl)hexamethylenimine, according to Claim 2 wherein Ar is 2,4-dichlorophenyl.

17. 1 - (N-Lower-alkyl-4-trifluoromethoxybenzimidoyl)hexamethylenimine, according to Claim 2 wherein Ar is p-trifluoromethoxyphenyl.

18. 1 - (N - Lower-alkyl - 4 - aminobenzimidoyl)hexamethylenimine, according to Claim 2 wherein Ar is p-aminophenyl.

19. 1 - (N-Hydroxy-lower-alkyl-4-chlorobenzimidoyl)hexamethylenimine, or the acetate thereof, according to Claim 1, wherein Ar is p-chlorophenyl, n is 0, N=Z is hexamethylenimino, and R is hydroxy-lower-alkyl or acetoxy-lower-alkyl.

20. 1 - (N-Lower-alkyl-2,5-dichlorobenzimidoyl)hexamethylenimine, according to Claim 2 wherein Ar is 2,5-dichlorophenyl.

21. 1 - (N - Lower-alkyl-3-lower-alkanoylamino-4-chlorobenzimidoyl)hexamethylenimine, according to Claim 2 wherein Ar is 3-lower-alkanoylamino-4-chlorophenyl.

22. 1-[N-(n-Propyl)-3-amino - 4 - chlorobenzimidoyl] hexamethylenimine, according to Claim 1.

23. 1 - (N - Allyl-p-chlorobenzimidoyl)hexamethylenimine, according to Claim 3.

24. 1 - [N-(n-Propyl) - p - chlorobenzimidoyl]hexamethylenimine, according to Claim 5.

25. 1 - (N-Benzyl - p - chlorobenzimidoyl)hexamethylenimine, according to Claim 6.

26. 1 - [N-(2-Phenylethyl)-p-chlorobenzimidoyl]hexamethylenimine, according to Claim 6.

27. 1 - (N - Allyl-4-bromobenzimidoyl)hexamethylenimine, according to Claim 3.

28. 1 - (N-Cyclopropylmethyl - p - chlorobenzimidoyl)hexamethylenimine, according to Claim 4.

29. 1 - (N - Isopropyl-4-chlorophenylacetimidoyl)hexamethylenimine.

30. 1 - (N - Allyl-p-fluorobenzimidoyl)hexamethylenimine, according to Claim 3.

31. 1 - (N-Allyl-p - trifluoromethylbenzimidoyl)hexamethylenimine, according to Claim 1.

32. 1 - (N-Cyclohexylmethyl-p-chlorobenzimidoyl)hexamethylenimine, according to Claim 1.

33. 1 - [N - (2-Butenyl)-p-chlorobenzimidoyl]hexamethylenimine, according to Claim 3.

34. 1 - [N-(n-Butyl)-p-chlorobenzimidoyl]hexamethylenimine, according to Claim 5.

35. 1 - [N-(2-Methylbutyl)-4-chlorobenzimidoyl]hexamethylenimine, according to Claim 5.

36. 1 - [N-(n-Propyl)-4-iodobenzimidoyl]hexamethylenimine, according to Claim 5.

37. 1 - (N - Methyl-4-chlorobenzimidoyl)hexamethylenimine, according to Claim 5.

38. 1 - [N-(n-Propyl)-2-nitro - 4 - chlorobenzimidoyl] hexamethylenimine, according to Claim 7.

39. 1 - [N-(n - Propyl)-4-methoxybenzimidoyl]hexamethylenimine, according to Claim 8.

40. 1 - (N-Isopropyl-2-chlorobenzimidoyl)hexamethylenimine, according to Claim 9.

41. 1 - (N - Isopropyl - 3-chlorobenzimidoyl)hexamethylenimine, according to Claim 12.

42. 1 - [N - (n-Propyl)-3,4-dichlorobenzimidoyl]hexamethylenimine, according to Claim 13.

43. 1 - [N-(n-Propyl)-4-nitrobenzimidoyl]hexamethylenimine, according to Claim 11.

44. 1 - [N-(n-Propyl)-3-methoxy - 4 - chlorobenzimidoyl]hexamethylenimine, according to Claim 14.

References Cited

UNITED STATES PATENTS

| 2,211,280 | 8/1940 | Martin et al. | 260—564 R |
|---|---|---|---|
| 3,598,800 | 8/1971 | Gätzi | 260—564 R |
| 3,125,573 | 3/1964 | Elpern | 260—564 |

FOREIGN PATENTS 715,849  11/1968  Belgium _____ 260—239

HARRY I. MOATZ, Primary Examiner

U.S. Cl. X.R.

424—244; 260—566 D, 239 BF, 499 CD, 556 A, 556 AR, 562 R